(No Model.)  2 Sheets—Sheet 1.

T. B. WIRE.
CAR DUMPER.

No. 280,430. Patented July 3, 1883.

WITNESSES

INVENTOR
Theodore B. Wire
By Leggett & Leggett
ATTORNEYS (No Model.) 2 Sheets—Sheet 2.

T. B. WIRE.
CAR DUMPER.

No. 280,430. Patented July 3, 1883.

WITNESSES
INVENTOR
Theodore B. Wire
By Leggett & Leggett ATTORNEYS

UNITED STATES PATENT OFFICE.

THEODORE B. WIRE, OF GENEVA, OHIO.

CAR-DUMPER.

SPECIFICATION forming part of Letters Patent No. 280,430, dated July 3, 1883.

Application filed April 6, 1883. (No model.)

*To all whom it may concern:*

Be it known that I, THEODORE B. WIRE, of Geneva, in the county of Ashtabula and State of Ohio, have invented certain new and useful Improvements in Car-Dumping Devices; and I do hereby declare the following to be a full, clear, and exact description of the invention, such as will enable others skilled in the art to which it pertains to make and use the same.

My invention relates to improvements in mechanism for dumping cars, and also including a device for discharging the loading into suitable receptacles, in which it may be discharged on shipboard or elsewhere; and it consists of certain features of construction and combination of parts, hereinafter described, and pointed out in the claims.

Figure 1:
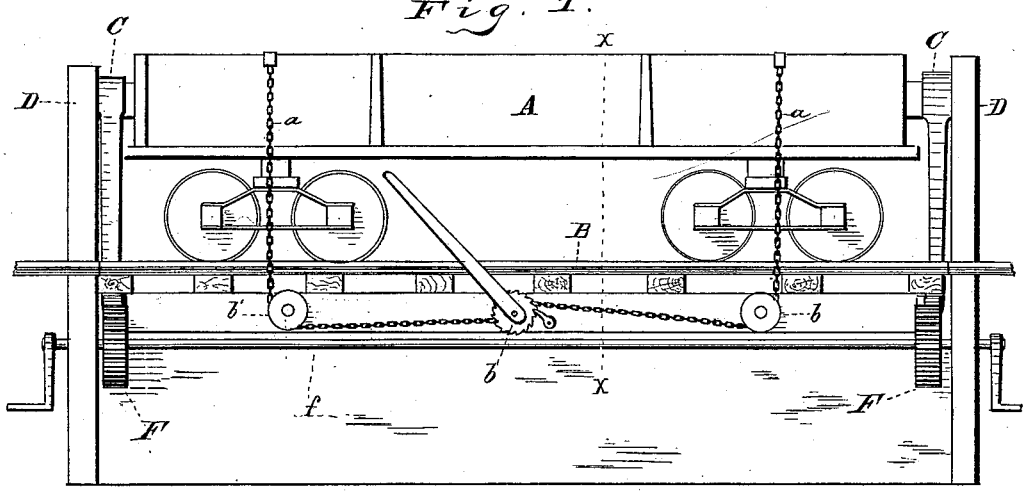
Figure 2:
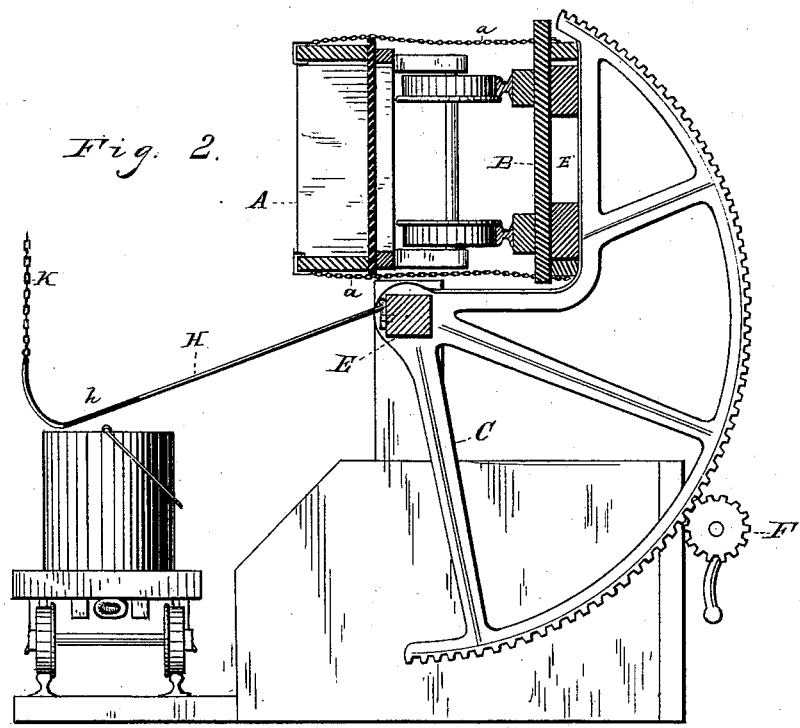
Figure 3:
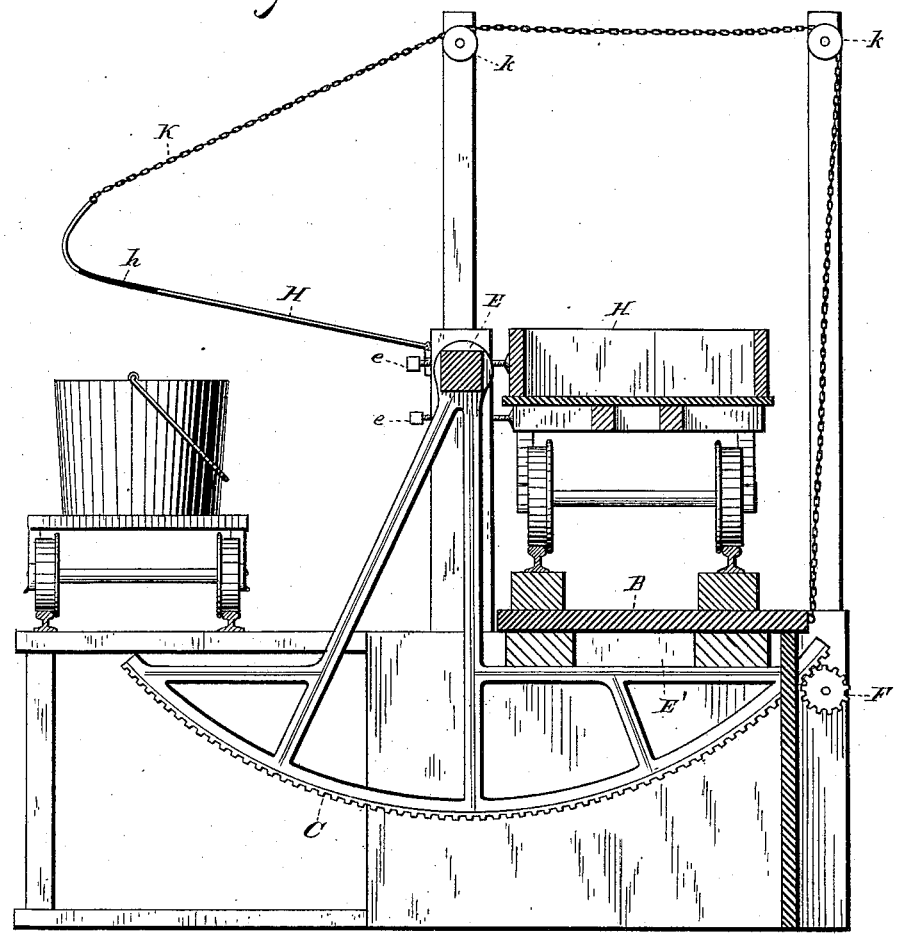
Figure 4:
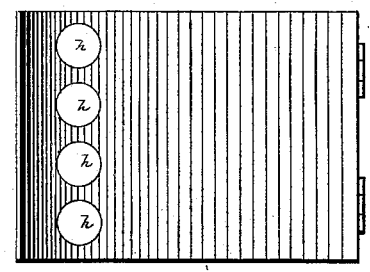

In the drawings, Figure 1 is a side elevation of a car and track, showing also certain portions of my new device. Fig. 2 is a cross vertical section taken on the lines $xx$, Fig. 1, showing a car in the process of dumping, and also showing a car with buckets and a chute for loading the same. Fig. 3 is also a horizontal section taken on the same line as Fig. 2, but with the large car in its horizontal position and the chute elevated. Fig. 4 is a plan view of the chute.

A represents a car; B, the track, including the necessary platform or support for the track.

C represents segment-gears supporting said track. These gears C are attached to the shaft E, which has its bearing in the supports D. The shaft E, if so desired, may be omitted, and in its place trunnions may be substituted, that are attached to their respective segment-gears and operate in the supports D in the same manner as the said shaft. The segment-gears are engaged by the pinions F, which are attached to the shaft $f$. By revolving the shaft $f$ and the attached gears F, the segment-gears are caused to turn on bearings furnished by the shaft E or the said equivalent trunnions, and the car is thereby tilted, as shown in Fig. 2, and the load dumped.

In order to hold the car firm on the track while it is being tilted and dumped, the chains $a$ are provided, which are attached to the car. The chains are passed under grooved pulleys $b'$, and are attached to the shaft $b$, which, together with the pulleys $a$, are attached to the track or its supports. The shaft $b$ extends far enough beyond the track on either side for the attachment of the said chains, and is provided with a ratchet-wheel, pawl, and lever for tightening the chains. Also, lateral supports from the shaft E or the said trunnions or the arms of the segment-gears may be provided by means of screws $e$ or other suitable device, so that the car, as it is turned on its side, will rest mainly on these supports. The position of the bearings—such as furnished by the shaft E or the said trunnions—in relation to the car may be varied according to circumstances. If it is desired to elevate the car when it is dumped, the said shaft E or other equivalent bearings may be placed as shown, or even still higher. If, however, the railroad-track is of such elevation that the load may be dumped to a lower level, then in that case the shaft E or equivalent may be placed in a lower position—such as, for instance, at the point E', Fig. 3. In such case it will require but little power to dump the load, the maximum power being required to turn the empty car back to its upright position.

In many instances it is desired to dump the load into buckets or suitable vessels for delivering on shipboard or elsewhere by means of derricks, cranes, or other devices. In such case the said buckets or vessels may be placed on a suitable car, that may be run to any desired point. To facilitate the dumping of the car-load into these buckets, I have devised an apron or chute, H, (shown in Figs. 2, 3, and 4,) that is provided with a broad rim around the lower portion of it to keep the coal, grain, or other kind of loading that is being dumped from going too far, and provided also with suitable hobs in the bottom of the chute to guide and discharge the said loading into the said buckets or vessels. The upper side of the chute is hinged in such a manner that the said chute shall not only receive the car-load as it is dumped, but shall also have such a position or have such an inclination as to conduct the said load into the said buckets or vessels. The chute is provided with the chains K, running over the grooved pulleys $k$, for raising or lowering the side of the chute. The said chains K are attached to the track B or some portion of the dump in such a manner that in the tilting of the car process it will slack the said chains and cause the side of the chute to be lowered upon the ends of the buckets or other rests provided for the same, and that when the track is again brought to its horizontal position it will draw on said chains and raise the side of the chute from the said buckets or rests, thus leaving the car supporting the said buckets free to be moved to any point desired.

What I claim is—

1. In a car-dumping apparatus, a suitably-supported shaft provided with segmental hangers having a horizontal portion, upon which the platform and track are built, in combination with means for partially rotating the hangers, substantially as shown and described.

2. In a car-dumping apparatus, the combination, with a suitably-fixed structure and a shaft journaled thereto, of two or more segmental hangers provided with gear-teeth, and a horizontal portion adapted to support the track-platform, the said portion being below the pivotal point of the hangers, substantially as shown.

3. In a car-dumping apparatus, the combination, with the car-platform adapted to be elevated from a horizontal to a vertical position, of an adjustable chute for guiding and delivering the load from the cars, and adapted to be vertically adjusted by the return movement of the dumping apparatus, substantially as set forth.

In testimony whereof I sign this specification, in the presence of two witnesses, this 30th day of December, 1882.

THEODORE B. WIRE.

Witnesses:
C. H. DORER,
ALBERT E. LYNCH.